UNITED STATES PATENT OFFICE.

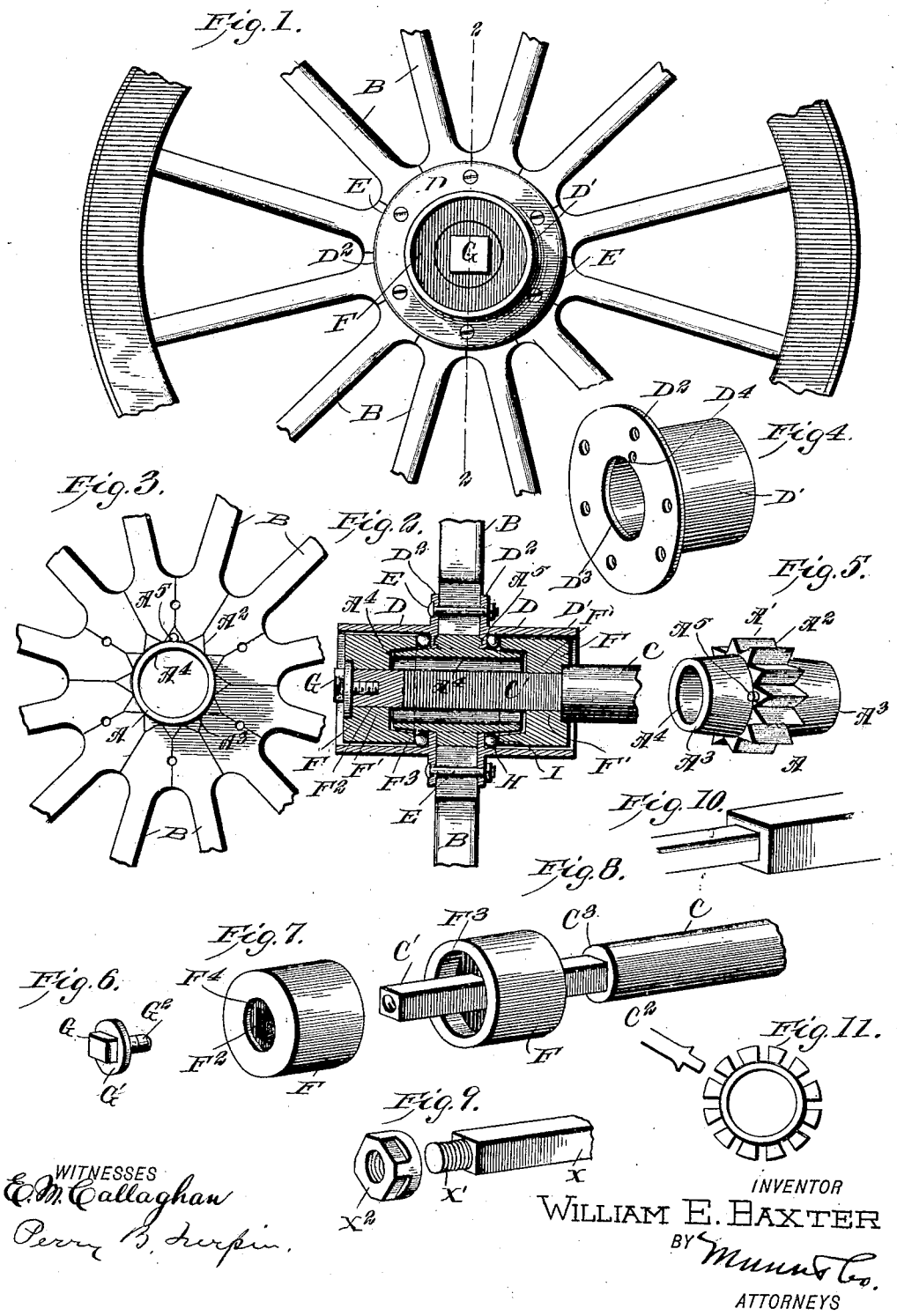

WILLIAM EDWARDS BAXTER, OF FRANKFORT, KENTUCKY.

HUB, SPINDLE, AND AXLE-ARM.

No. 904,921.　　　Specification of Letters Patent.　　　Patented Nov. 24, 1908.

Application filed December 30, 1907. Serial No. 408,578.

*To all whom it may concern:*

Be it known that I, WILLIAM EDWARDS BAXTER, a citizen of the United States, and a resident of Frankfort, in the county of Franklin and State of Kentucky, have invented certain new and useful Improvements in Hubs, Spindles, and Axle-Arms, of which the following is a specification.

This invention is an improvement in hubs, spindles, and axle arms, and consists in certain novel constructions and combinations of parts as will be hereinafter described and claimed.

In the drawing Figure 1 is a side view partly broken away of a wheel embodying my invention. Fig. 2 is a cross-section on about line 2—2 of Fig. 1. Fig. 3 is a side view of the hub with the spokes in place, parts of the latter being broken away. Fig. 4 is a detail perspective view of one of the thimbles. Fig. 5 is a detail perspective view of the hub. Fig. 6 is a detail perspective view of the cap for the axle arm. Fig. 7 is a detail perspective view of the outer cup. Fig. 8 is a detail perspective view of the axle arm, and a portion of the axle, the inner cup being placed on the axle arm, and Fig. 9 illustrates a somewhat different construction for securing the several parts on the axle arm. Fig. 10 illustrates a somewhat different construction of axle, and Fig. 11 illustrates a different construction of hub from that shown in Fig. 5.

In carrying out my invention I employ a hub A, shown in detail in Fig. 5, and having a central or body portion $A'$ provided with notches $A^2$ in which are seated the inner ends of spokes B, and on opposite sides of this body $A'$, the hub A is provided with tubular portions $A^3$, which are preferably conical on their outer sides, as shown, forming cones upon which bear the inner and outer cups as presently described. The bore $A^4$ of the hub A is considerably larger than the arm $C'$ of the axle C so that the hub revolves freely around the arm $C'$, but does not contact therewith in the use of the invention, as best shown in Fig. 2 of the drawing.

On the opposite sides of the spokes and of the body $A'$ of the hub, I provide thimbles D, which are alike, so a description of one will answer for both. These thimbles have the cylindrical portions $D'$ which extend outwardly over the tubular portions of the hub, and also over the inner and outer cups presently described and at their inner ends the thimbles are provided with outwardly projecting flanges $D^2$ which are secured by bolts E to the spokes and the thimbles also have the inwardly projecting flanges $D^3$, which bear on opposite sides of the body $A'$ of the hub and the ring surfaces of the inwardly projecting flanges bear partly on the conical tube-like parts of hub A adjacent to the part $A'$ and in these flanges $D^3$ I form sockets $D^4$ into which project dowel pins $A^5$ at the opposite sides of the body $A'$ of the hub, as will be understood from Figs. 2, 4 and 5 of the drawing. This construction operates to connect the thimbles securely with the hub and to preserve the said parts in proper alinement in the practical use of the invention.

The arm $C'$ of the axle is non-circular in cross-section and preferably square, and receives the inner and outer cups F, which may be alike, as will be understood from the drawing, one of these cups fitting over the inner end of the arm $C'$ and the other over the outer end of said arm, as shown in Fig. 2. These cups have the body portions $F'$, having each an opening $F^2$ to fit the angular arm $C'$ of the axle, and each of the cups is provided at one end with a projecting tubular portion $F^3$ which fits over and bears on the corresponding tubular portion of the hub. The portions $F^3$ are correspondingly conical or tapered on bearing surfaces relatively to parts $A^3$, and the cups are provided at their ends opposite the portions $F^3$ with, preferably, circular recesses $F^4$ to receive the shoulder $C^3$ at the end $C^2$ of the axle C, or to receive the circular portion $G'$ of the cap G, shown in detail in Fig. 6, and applied in Fig. 2. The inner cup F recessed receiving the end of the axle C forms a dust or sand band, and gives strength, while the fitting of the cap in the recess of the outer cup gives a better finish to the parts at such end of the wheel, also gives strength, and improves the general construction, as will be understood from Fig. 2 of the drawing. It is evident that the axle could be made square, as shown in Fig. 10, and the recess in the cup could be made square to receive the same.

By the described construction, it will be noticed I provide a wheel and spindle in which the inner and outer cups are held upon the axle arm from turning thereon and fit over the tubular portions of the hub, which tubular portion fits over but turns freely around the axle arm, and does not contact therewith so that the load is borne by the bearing of the cups on the axle arm upon the tubular portion of the hub and I provide between the inner ends of the cups and the inwardly projecting flanges of the thimbles, and the cylindrical (inner) portions D' of the thimbles and the tubular portions of the hub, ball races at H in which balls, I, may be placed to form a ball bearing wheel when desired, and it will be noticed that in order to provide this race it is only necessary to turn off or otherwise shorten the tubular portions of the cups to make the necessary space for balls, the combination of the hub, thimble and cup thus forming the ball race. The tubular portions of the cups bear upon the tubular portions of the hub and by adjusting the cups upon the axle arm, in a rotary direction which may be accomplished by removing the said cups and giving them a quarter or other turn, as desired and then re-applying them to the axle arm, fresh wearing surfaces may be provided.

As described, the spokes B are fitted in the seats A² in the body portion of the hub and if they get loose at any time one of the thimbles can be removed and wedges driven between the inner ends of the spokes and the hub, thus tightening the wheel without the necessity of cutting the tire. It will also be understood that a broken spoke can be readily removed and another inserted without taking down the wheel or cutting the tire. The seats A² may be grooves with parallel sides, and the spokes may have tenons for fitting therein as shown in Fig. 11. The spokes may be dished in the ordinary manner if desired and are securely held by the combination hub A, thimbles D and the bolts E when the parts are united, as shown in Fig. 2.

As mentioned above a receptacle is formed constituting a ball race in which the balls may be placed so that the balls will play against the inner ends or lips of the tubular portions of the cups when the wheel is deflected in the direction of either, so that if the wheel is deflected to one side it will cause the balls to bear against the cup on such side in the use of the wheel.

The dowel pins A⁵ in connection with the thimbles tend to make the wheel stronger and to preserve a proper alinement.

In Figs. 2 and 6 the end cap is shown as provided with a bolt G² to screw into a socket in the end of the arm C'. If desired, the construction shown in Fig. 9 may be employed in which the arm X is provided at its outer end with a threaded tenon X' and the cap is in the form of a nut X² to screw on said tenon.

It is preferred to make the tubular portion of the hub conical in order that the draft may be lighter and as the weight comes upon the top of this cone surface and against the inner upper sides of the cups, which sides are conical, tapered, or beveled, to correspond with A³ of Fig. 5, the tendency of the double cone surface bearing is to force the cups to their natural bearings on the axle arm and against and lapping the shoulder C³, and the shoulder of the cap at the outer end of the arm. I thus provide a cone bearing hub to which in order to add the ball bearing feature, it is only necessary to turn off or otherwise shorten the circular lip portions of the cups in order to give room for insertion and play of the balls, as will be understood from Fig. 2, thus making a combined cone bearing and ball bearing hub and spindle.

When a wheel of this character is running on a level road the bearing is strictly a cone bearing, but when running on an uneven surface or roadway, with the balls added, the bearing then becomes a combined cone bearing and ball bearing apparatus.
By making the axle arm square and fitting the hub loosely thereon I form four communicating compartments in which cup grease can be inserted for self-feeding lubrication, the lubricant readily finding its way between the joints of the bearing to the wearing parts.

It is preferred to form the thimbles in one piece, the outwardly projecting flanges receiving the rivets or bolts for securing the spokes as well as providing a side surface for the alinement and lateral bearing of the spokes, and the inwardly projecting flange bearing against the side, and cone surface, in part, of the hub body, and interlocking therewith by the dowel and pin construction before described and aiding in forming the ball race when the parts are assembled, as shown in Fig. 2.

I claim—
1. The combination substantially as herein described of the axle having an arm angular in cross-section and a shoulder at the inner end of said arm, a cup having a body portion provided with an opening conforming to the arm and adjusted thereon up against the said shoulder and having in its inner end a recess receiving the shouldered end of the axle and provided at its other end with the outwardly projecting tubular portion, with tapered interior circular bearing, a cup having a body portion fitting on the outer end of the arm and having an inwardly projecting tubular portion corresponding to that of the inner cup, and having its outer end recessed, a wheel hub having a body portion provided with notches for spokes and at its opposite sides dowel pins, the hub being provided with a bore or opening fitting loosely over the arm or spindle and with tubular portions projecting within the tubular portions of the inner and outer cups and tapered or conical on their outer sides, the spokes fitting in the seats of the hub body, thimbles fitting over the cups and having outwardly projecting flanges lapping alongside and secured through the spokes, and inwardly projecting flanges fitting on opposite sides of the hub body and provided with sockets receiving the dowel pins thereof, and balls between said inwardly projecting flanges of the thimbles and the ends of the tubular portions of the cups, substantially as and for the purpose set forth.

2. The combination of an axle, a wheel hub fitting loosely on the arm and having the inwardly and outwardly projecting tubular portions, inner and outer cups fitting on the arm of the axle and adjustable to different positions on the said arm and provided with projecting tubular portions fitting over the tubular portions of the hub and thimbles having outwardly projecting flanges to lap alongside spokes, and inwardly projecting flanges lapping along the opposite sides of the hub body, substantially as set forth.

3. The combination with the axle and its arm, of a hub fitting on said arm and provided at its opposite sides with projecting dowel pins and having inwardly and outwardly projecting tubular portions tapered or conical on their outer sides and cups on the axle arm and having tubular, tapered portions fitting over the tubular portions of the hub and thimbles fitting over the cups and provided with inwardly projecting flanges having sockets receiving the dowel pins of the hub, substantially as set forth.

4. The combination of the axle having an arm, a hub fitting loosely over the arm and having inwardly and outwardly projecting tubular portions, cups fitting on the axle arm and having tubular portions fitting over the tubular portions of the hub, thimbles coöperating with the hub and cup tubes and forming ball races, and balls in said races and against which the ends of the tubular portions of the cups bear, substantially as set forth.

5. The combination with the hub body provided at its opposite sides with projecting dowel pins and having the inwardly and outwardly projecting tubular portions, of the thimbles having the outwardly projecting flanges and also provided with the inwardly projecting flanges extending on opposite sides of the hub body and provided with sockets receiving the dowel pins of the hub, spokes between the outwardly projecting flanges of the thimbles, the axle arm, the inner and outer cups on said axle arm and having tubular portions fitting over the tubular portions of the hub, and the balls against which the ends of the tubular portions of the cups bear, substantially as set forth.

6. The combination of the axle arm, a hub fitting loosely on said arm and having inwardly and outwardly projecting tubular portions, cups having non-circular portions fitting on the arm of the axle whereby they may be adjusted to different positions thereon, the said cups being provided with tubular portions fitting over the inner and outer tubular portions of the hub and thimbles fitting over the cups and having inwardly projecting flanges interlocked with the hub, all substantially as and for the purpose set forth.

WILLIAM EDWARDS BAXTER.

Witnesses:
W. C. PRIEST,
W. H. GODWIN.